3,600,141
TUBE FURNACE FOR RECOVERY OF SYNTHESIS GASES FROM HYDROCARBON CRACKING
Paul Mevenkamp, Lichtendorf, and Hans-Dieter Marsch, Dortmund, Germany, assignors to Friedrich Uhde G.m.b.H., Dortmund, Germany
Filed Dec. 2, 1968, Ser. No. 780,539
Claims priority, application Germany, Dec. 4, 1967, P 16 67 324.8
Int. Cl. B01j 9/04
U.S. Cl. 23—288                                       4 Claims

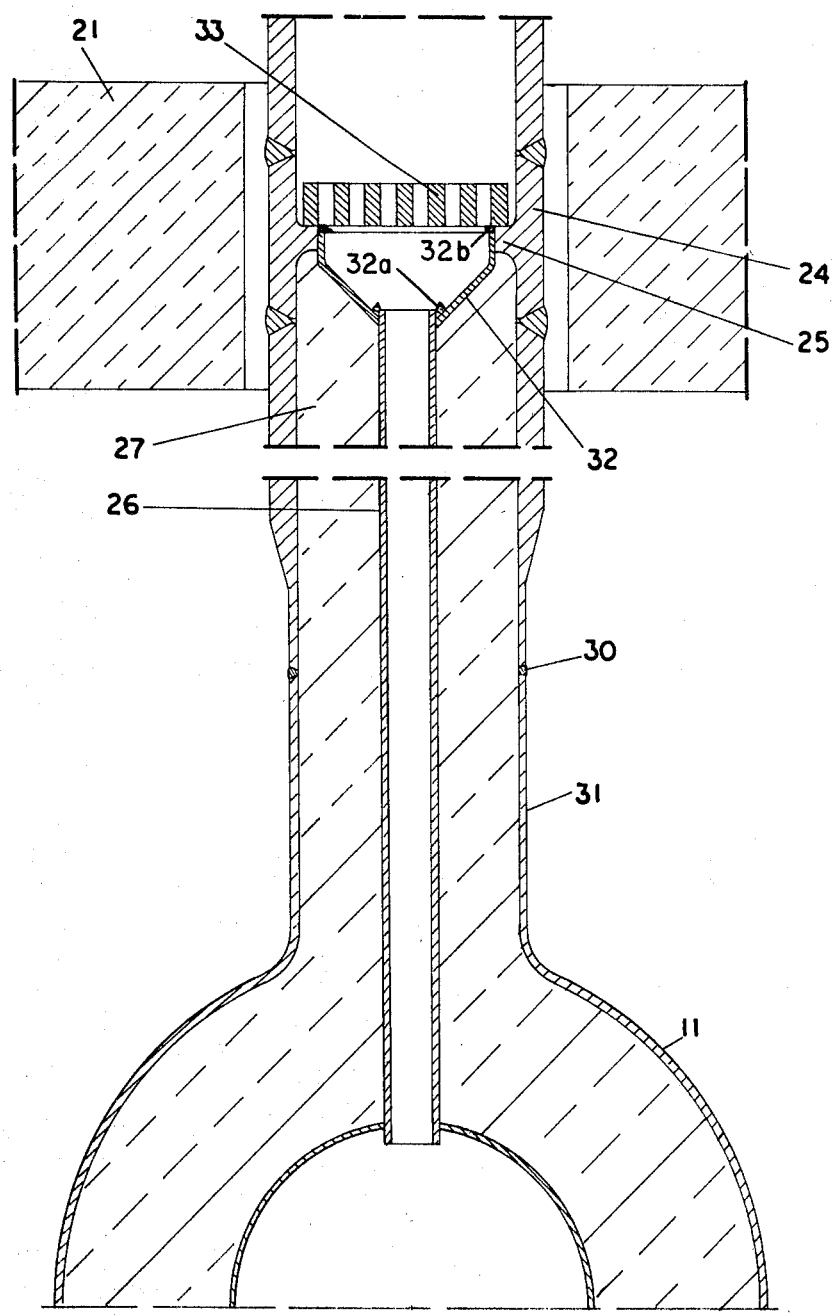

ABSTRACT OF THE DISCLOSURE

A tube furnace for the recovery of synthesis gases from hydrocarbon cracking in which a reaction pipe extends through the furnace floor and is solely supported at its lower end beneath such floor by a collector pipe to which it is connected by a welded joint which can be broken for repairing the reaction pipe. Centrally of the reaction pipe is a central pipe leading from the collector to the furnace floor. A sealing member is rigidly connected respectively to the upper end of the central pipe and the reaction pipe preventing reaction gases from passing to the space between the central and reaction pipes. Thermal insulation fills the space between the central pipe and the reaction and collector pipes, as well as between the sealing member and the reaction pipe.

BACKGROUND OF THE INVENTION

A tube furnace for the indirect heating of dissociable media, particularly for the cracking or dissociation of hydrocarbons for the recovery of synthesis-gases, sewer gas and hydrogen has been developed in which the reaction pipes are supported solely at their lower ends and project in vertical arrangement freely into the combustion chamber or firebox. The reaction pipes form with the collecting pipes which lie beneth the furnace, a fixedly connected and rigid assembly, whereby the collectors carry the pipes and the collecting pipes as well as the lower ends of the reaction pipes are provided almost up to the upper edge of the furnace floor with an interior thermal insulation. By means of such insulation, the pipe wall temperature under the furnace is rapidly decreased. In this way, it is possible to construct the pipe collecting assembly which is located beneath the furnace, of normal carbon steel.

For the lower part of the reaction pipe, it is possible to convey the reaction product through a central pipe, the insulation being disposed between this central pipe and the reaction pipe. In order to remove the catalyst mass downwardly from the reaction pipe, the reaction pipes were connected with the collecting pipes through flange connections.

SUMMARY OF THE INVENTION

If the catalyst mass may be or must be sucked off or removed upwardly from the pipes, then it is not necessary to provide flange connections between the reaction pipes and the collecting pipes. By eliminating flange connections between the reaction pipes and the collecting pipes, numerous pairs of flanges are avoided, as well as the danger of leaks through pairs of flanges buckled or warped under thermal or heat stresses. If with a construction of this type, for purposes of repair, a reaction pipe is to be removed from the furnace, then by using carbon steel for the extension of the reaction pipe or as transition-piece, the reaction pipe may be separated in simple manner from the collecting pipe and may subsequently be secured thereto by a welded seam which can be easily made at the construction site.

It is now unnecessary to employ the flange connections between the reaction pipes and the collecting pipes. In the improved construction, the central pipes project into the collecting pipes and rigid connections through packing or sealing members are provided between the central pipes in the region of the furnace floor and the reaction pipes. This structure militates against the seepage of reaction gases to the reaction tubes, which would excessively heat them, and eliminates the necessity of employing gas-tight insulation between the central tubes and the reaction pipes.

BRIEF DESCRIPTION OF THE DRAWING

The figure is a vertical sectional fragmentary view of a reaction tube which projects below the furnace floor, a collecting tube and associated parts.

DESCRIPTION OF THE PREFERRED EMBODIMENT

The illustrated embodiment of the invention comprises a furnace floor 21, which is apertured to receive a reaction pipe 24 supported by a collector pipe 31 rigidly connected thereto by a welded seam 30. The collector pipe in turn is secured by a welded seam to a collector 11 and supported thereby. The reaction pipe 24, in view of the intense heat to which it is subjected, is of a high alloyed steel but the collector pipe 31 is of carbon steel. It will be observed that the wall thickness of the reaction pipe 24 is quite substantial until it thins out below the furnace floor 21 to about one-third of its thickness in the region where it is connected by the weld joint 30 to the collector pipe 31. The collector pipe 31 and collector 11 are likewise relatively thin walled and, as shown, are of about one-third the normal thickness of the reaction pipe.

Arranged centrally of the reaction pipe and extending to the collector 11 is a metallic pipe 26, the upper end of which is disposed below the upper surface of the furnace floor 21. Suitable thermal insulation 27 is interposed between the outer wall of the central pipe throughout its length and the adjacent inner walls of the reaction pipe 24, collector pipe 31, as well as the collector 11. The upper end of the central pipe 26 is welded at 32a to the lower end of a metallic sealing member 32 which has a conical bottom portion and an annular top or rim portion. The annular top portion of the sealing member 32 is welded at 32b to a cylindrical flange 25 projecting inwardly from a section of the reaction pipe 24. This reaction pipe section, as shown, is separate but is rigidly secured at its upper and lower ends by welded joints to the adjacent reaction pipe portions.

It will be observed that the insulation 27 surrounds the sealing member 32 up to the flange 25, thereby militating against the seepage or sneak currents of reaction gases to the adjacent portion of the reaction and collector pipes. As a consequence, these portions of the reaction pipe and the collector pipe are greatly reduced in temperature. Thus, the sealing member 32 not only is effective in sealing the space between the central pipe 26 and the reaction and collector pipes from reaction gases, but also provides a rigid support for the central pipe 26 so that the central pipe, as well as the reaction pipe, are as a rigid assembly supported solely at its bottom end by the collector pipe 31 and subjacent structure.

The internal annular flange 25 also provides a shelf on which a catalyst grid 33 rests and this grid provides a support for the catalyst mass located above it in the reaction pipe 24.

It will be apparent that the reaction pipe 24 may be readily separated from the collector pipe 31 by breaking the welded joint 30, so that repairs can be readily effected at the construction site. Assembly can be made easily by providing a new welded seam 30.

What we claim is:

1. In a tube furnace for the cracking of hydrocarbons for the recovery of synthesis gases in which the furnace has a floor,
   - a vertically disposed reaction pipe projecting through an aperture in the furnace floor,
   - a collector beneath the furnace floor,
   - a collector pipe rigidly connected respectively to the said reaction pipe and collector, the reaction pipe being solely supported at its lower end thereby,
   - a central pipe arranged centrally of said reaction and collector pipes and extending from said collector to a point below the upper surface of the furnace floor,
   - a sealing member rigidly connected to the upper end of said central pipe and the inner wall of said reaction pipe thereby to prevent reaction gases from passing to the space between said central pipe and said reaction and collector pipes,
   - a catalyst supporting member in said reaction pipe above said sealing member, and
   - thermal insulation material filling the space between said central pipe and said reaction and collector pipes.

2. In a tube furnace as claimed in claim 1, in which said sealing member comprises a metallic cone shaped member having a cylindrical rim, a welded connection between said lower end of said cone shaped member and said central tube and a welded connection between said cylindrical rim and said reaction pipe, the insulation material filling the space between said sealing member and said reaction pipe.

3. In a tube furnace as claimed in claim 1, in which said reaction pipe is of a metal highly resistant to heat, and said collector pipe is of carbon steel, and a weld joint between the upper end of said collector pipe and the lower end of said reaction pipe whereby the joint may be broken for repairs.

4. In a tube furnace as claimed in claim 3, in which the walls of said collector pipe are about one-third the thickness of said reaction pipe where the latter is subjected to reaction temperatures.

References Cited

UNITED STATES PATENTS

| | | | |
|---|---|---|---|
| 2,518,583 | 8/1950 | Watson | 23—288 |
| 2,833,631 | 5/1958 | Rossheim et al. | 23—288 |
| 3,488,161 | 1/1970 | Herp, Jr. | 23—289 |

JOSEPH SCOVRONEK, Primary Examiner

U.S. Cl. X.R.

23—277; 48—102, 196; 122—164